United States Patent
Seo

(10) Patent No.: US 8,559,806 B2
(45) Date of Patent: Oct. 15, 2013

(54) CAMERA MODULE AND METHOD FOR MANUFACTURING THE SAME

(75) Inventor: Dong Hyun Seo, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 120 days.

(21) Appl. No.: 13/064,184

(22) Filed: Mar. 9, 2011

(65) Prior Publication Data
US 2012/0170923 A1    Jul. 5, 2012

(30) Foreign Application Priority Data
Dec. 29, 2010   (KR) ................ 10-2010-0138337

(51) Int. Cl.
G03B 13/34    (2006.01)
(52) U.S. Cl.
USPC .......................................................... 396/133
(58) Field of Classification Search
USPC .......................................... 359/665; 396/133
See application file for complete search history.

(56) References Cited

U.S. PATENT DOCUMENTS

| | | | |
|---|---|---|---|
| 2006/0056042 A1 | 3/2006 | Kim et al. | |
| 2008/0013187 A1* | 1/2008 | Craen et al. | 359/665 |
| 2008/0131112 A1* | 6/2008 | Aoki et al. | 396/429 |
| 2010/0091389 A1* | 4/2010 | Henriksen et al. | 359/811 |
| 2010/0247086 A1* | 9/2010 | Tallaron et al. | 396/133 |
| 2011/0051254 A1* | 3/2011 | Lee et al. | 359/666 |
| 2012/0113318 A1* | 5/2012 | Galstian et al. | 348/374 |
| 2012/0140101 A1* | 6/2012 | Afshari et al. | 348/308 |
| 2012/0200764 A1* | 8/2012 | Afshari et al. | 348/345 |

FOREIGN PATENT DOCUMENTS

| | | |
|---|---|---|
| DE | 10 2004 060 786 A1 | 3/2006 |
| EP | 2 262 095 A1 | 12/2010 |
| JP | 2006-309011 | 11/2006 |

OTHER PUBLICATIONS

German Office Action issued on Jul. 25, 2013 in the corresponding German patent application No. 102011018885.1.

* cited by examiner

*Primary Examiner* — Rodney Fuller
(74) *Attorney, Agent, or Firm* — Staas & Halsey LLP

(57) ABSTRACT

A camera module and a method for manufacturing the same. The camera module includes a lens unit including at least one lens stacked along an optical axis, an autofocusing unit disposed on an object side of the lens unit and automatically controlling a focus of the lens unit, an image sensor unit receiving light incident through the lens unit, and at least one via formed in the lens unit to be penetrated in a thickness direction thereof for an electrical connection of the autofocusing unit.

11 Claims, 3 Drawing Sheets

CAMERA MODULE AND METHOD FOR MANUFACTURING THE SAME

CROSS-REFERENCE TO RELATED APPLICATIONS

This application claims the priority of Korean Patent Application No. 10-2010-0138337 filed on Dec. 29, 2010, in the Korean Intellectual Property Office, the disclosure of which is incorporated herein by reference.

BACKGROUND OF THE INVENTION

1. Field of the Invention

The present invention relates to a camera module and a method for manufacturing the same, and more particularly, to a camera module having improved productivity while being miniaturized, by improving an electrical connection structure of an autofocusing unit of the camera module, and a method for manufacturing the same.

2. Description of the Related Art

Recently, a technology for various mobile devices having improved voice information and data transmitting and receiving functions while having easy portability has been rapidly developed and propagated. In particular, a terminal having a camera module including camera functions capable of capturing and storing moving images and still images of a subject, and transmitting the images to other persons by integrating a digital camera technology based camera module in the a portable wireless communication terminal, has been commercialized.

Optical devices such as a camera module for a small portable terminal have become high-pixel optical devices of 7 million pixels or more with recent technological developments and have been changed into a structure capable of implementing various additional functions such as autofocusing, optical zoom, and the like.

In particular, as a lens transfer unit for implementing autofocusing, an actuator has been mainly used, and as representative actuators, there are a voice coiled actuator (VCA) and a piezoelectric actuator.

However, the above-mentioned actuators are generally provided at a lens or on the outside of a lens barrel in order to transfer movement force to a lens or a lens barrel. Further, a separate conductor pattern is needed in order to realize the electrical connection of the actuator, such that the overall size of the camera module may be increased.

Therefore, when the camera module is mounted in a limited space such as a portable terminal, it is difficult to assemble the camera module due to the lack of mounting space therefor within the terminal.

SUMMARY OF THE INVENTION

An aspect of the present invention provides a camera module capable of implementing an autofocusing function while minimizing the increase in the overall size thereof, and a method for manufacturing the same.

According to an aspect of the present invention, there is provided a camera module, including: a lens unit including at least one lens stacked along an optical axis; an autofocusing unit disposed on an object side of the lens unit and automatically controlling a focus of the lens unit; an image sensor unit receiving light incident through the lens unit; and at least one via formed in the lens unit to be penetrated in a thickness direction thereof for an electrical connection of the autofocusing unit.

The at least one via may be formed by filling at least one through hole penetrating through the lens unit in the thickness direction thereof with a conductive material.

The at least one via may connect a first electrode pad formed on the wafer of the image sensor unit with a second electrode pad formed on the autofocusing unit.

The image sensor unit may include a cover glass covering an image formation area in which light transmitting the lens unit is imaged.

The at least one via may be formed by penetrating through the cover glass in a thickness direction thereof.

The at least one via may be formed formed at an edge of the lens unit.

Each of the at least one lens may include a lens function part and a flange part forming an outside of the lens function part.

The at least one via may be formed in the flange part .

The autofocusing unit may be a liquid lens.

According to another aspect of the present invention, there is provided a method for manufacturing a camera module, including: stacking at least one lens wafer on which a plurality of lenses are arranged along an optical axis; stacking an autofocusing wafer automatically controlling a focus of the lens on an object side of the stacked lens wafer; forming at least one via penetrating through the stacked lens wafer in a thickness direction thereof for electrically connecting the autofocusing wafer; stacking an image sensor wafer receiving light incident from the lens on an image side of the stacked lens wafer; and cutting the stacked lens wafer, the autofocusing wafer, and the image sensor wafer for each module.

The forming of the via may include at least one through hole penetrating through the stacked lens wafer in the thickness direction thereof and filling the through hole with a conductive material.

The forming of the via may electrically connect a first electrode pad formed on the image sensor wafer to a second electrode pad formed on the autofocusing wafer.

The forming of the via may be formed to penetrate through a cover glass wafer covering an image formation area of the image sensor wafer in a thickness direction thereof.

The forming of the via may be formed at an edge portion of the unit lens of the lens wafer.

BRIEF DESCRIPTION OF THE DRAWINGS

The above and other aspects, features and other advantages of the present invention will be more clearly understood from the following detailed description taken in conjunction with the accompanying drawings, in which.

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
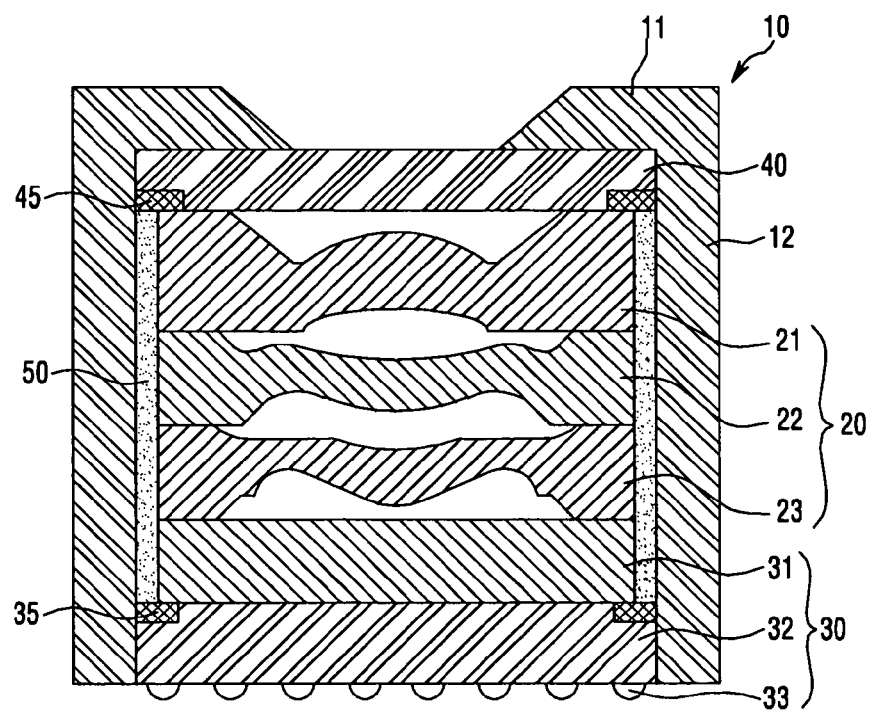
FIG. 1 is a cross-sectional view schematically showing a configuration of a camera module according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements.

Figure 2:
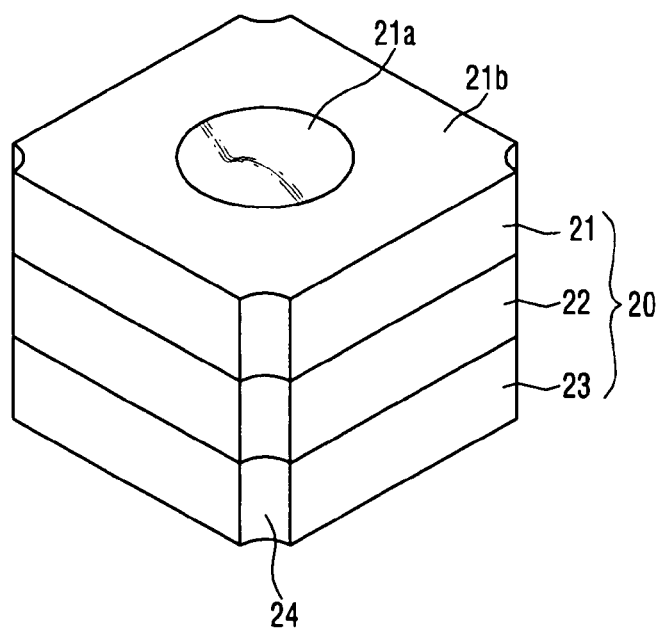
FIG. 2 is a perspective view showing a lens unit in a camera module according to an exemplary embodiment of the present invention.
Figure 3:
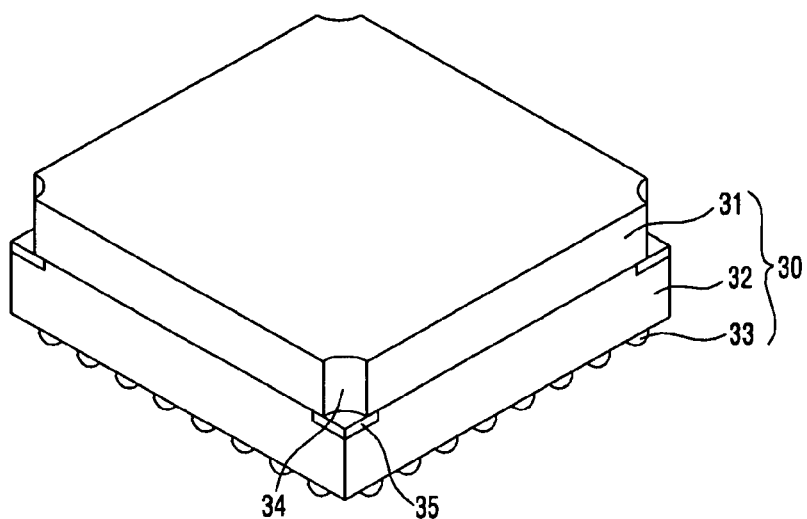
FIG. 3 is a perspective view showing an image sensor unit in a camera module according to an exemplary embodiment of the present invention.
Figure 4:
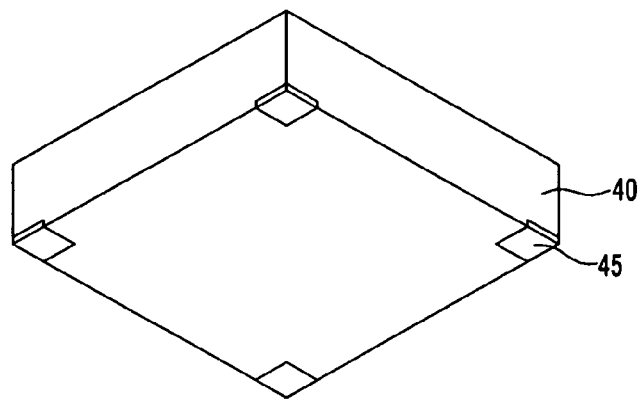
FIG. 4 is a perspective view showing an autofocusing unit in a camera module according to an exemplary embodiment of the present invention.

FIG. 1 is a cross-sectional view schematically showing a configuration of a camera module according to an exemplary embodiment of the present invention, FIG. 2 is a perspective view showing a lens unit in a camera module according to an exemplary embodiment of the present invention, FIG. 3 is a perspective view showing an image sensor unit in a camera module according to an exemplary embodiment of the present invention, and FIG. 4 is a perspective view showing an autofocusing unit in a camera module according to an exemplary embodiment of the present invention.

Referring to FIG. 1, the camera module according to the exemplary embodiment is configured to include a lens unit 20 including at least one lens, an image sensor unit 30 receiving light incident from the lens unit, an autofocusing unit 40 controlling a focus of the lens unit, and a housing 10 accommodating the lens unit 20, the image sensor unit 30, and the auto focusing unit 40.

Referring to FIG. 2, the lens unit 20 is configured to include a first lens 21, a second lens 22, and a third lens 23 that are formed sequentially from an object side to an image side. The first to third lenses 21 to 23 are sequentially stacked along an optical axis. The exemplary embodiment of the present invention describes that the lens unit 20 includes three lenses; however, the present invention is not limited thereto. Therefore, the lens unit 20 may include three or less, or three or more lenses.

The exemplary embodiment of the present invention describes that the lens unit 20 has a structure in which the plurality of lenses are stacked; however, the present invention is not limited thereto. Therefore, the lens unit 20 may have a structure in which the plurality of lenses are assembled while being inserted into a lens barrel and the structure of the lens assembly may be variously changed according to design conditions.

Lens manufactured by forming a surface of a transparent material into a spherical surface or aspherical surface is to focus an optical image by collecting or emitting light incident from an object. As kinds of the lens, there are a plastic lens and a glass lens. The plastic lens is manufactured on a wafer scale by putting a resin into a mold and performing pressurizing and curing processes thereon and then individualized. As a result, the plastic lens can be mass-produced at low cost. The glass lens is advantageous in terms of the implementation of high resolution, but it requires complicated manufacturing processes and expensive manufacturing costs due to necessity of cutting and polishing a glass. Further, it is difficult to provide a lens having a shape other than that of a spherical lens or a flat lens.

The exemplary embodiment of the present invention uses a plastic lens manufactured on a wafer scale. The first lens to third lens 21, 22 and 23 have a lens function part (only 21a is shown) formed into a spherical surface or aspherical surface at the center thereof and is provided with a flange part (only 21b is shown) forming the periphery of the lens function part 21a.

The lens function part 21a may have various shapes such as a meniscus shape formed to be protruded or depressed towards an object side, a meniscus shape formed to be protruded or depressed towards an image side, and a meniscus shape formed to be depressed towards an image side in the central portion thereof and then, protruded towards an image side in the proximity of the flange part, or the like. In addition, the flange part 21b may serve as a spacer that spaces the lens function part apart therefrom when adjacent lenses are stacked.

In the exemplary embodiment of the present invention, the first to third lenses 21 to 23 are formed in a quadrangular shape and is provided with a first through hole 24 for forming vias 50 at edges of each lens. That is, the first through hole 24 may be formed by perforating the flange part 21b of the lens unit 20 in a thickness direction and the via 50 may be formed by filling the first through hole 24 with a conductive paste.

Referring to FIG. 3, the image sensor unit 30 may be a chip scale package (CSP) including an image sensor chip 32 including an image formation area in which light transmitting the lens unit 20 is imaged.

The chip scale package (or, a chip size package) is a new package type, that has been recently developed, has many advantages over a typical plastic package. The largest advantage of the chip scale package is in a package size. According to the definition of International Semiconductor Industry Association such as Joint Electron Device Engineering Council (JEDEC), and Electronic Industry Association of Japan (EIAJ), the chip scale package is a classification name for a package generally having an area no greater than 1.2 times that of the die (integrated circuit). The chip scale package is mainly used for products requiring miniaturization and mobility such as a digital camcorder, a mobile phone, a notebook computer, a memory card, or the like. Semiconductor devices such as a digital signal processor (DSP), an application specific integrated circuit (ASIC), a micro controller, or the like, may be mounted in the chip scale package. In addition, the use of the chip scale package in which memory devices such as a dynamic random access memory (DRAM), a flash memory, or the like, are mounted has been expanded.

The image sensor chip 32 is a device that receives light and converts the received light into an electrical signal. Such image sensor chips may be classified into a CCD sensor chip and a CMOS sensor chip according to the operating and the manufacturing method. The charge coupled device (CCD) sensor chip is based on an analog circuit and is a scheme in which light incident into the lens unit 20 is emitted into several cells to allow each cell to store a charge for the light, whereby a contrast degree is determined depending on the magnitude in charge and the charge is transferred to a conversion device to represent colors. The charge coupled device can implement definite image quality and increases data storage capacity and power consumption, such that it is mainly used for a digital camera requiring high image quality. A complementary metal oxide semiconductor (CMOS) sensor chip is formed by integrating an analog signal processing circuit and a digital signal processing circuit on a semiconductor. The CMOS chip consumes power of about 1/10 as compared to the CCD sensor chip. Further, necessary components are generally formed in a single chip, thereby allowing more smaller products to be manufactured. With the recent developments of technology, the CMOS chip can implement high image quality in addition to these advantages, which has been used for several fields such as a digital camera, a camera phone, a PMP, or the like.

The top surface of the image sensor chip 32 has a wafer including the image sensor and the bottom surface of the image sensor chip 32 is provided with a connection member 33 to be connected with the terminal of a main substrate (not shown) on which the camera is mounted.

The connection member 33 may be made of a conductive paste, in particular, a solder paste or an Ag-epoxy resin. In addition, the connection member 33 may have a solder ball shape.

The top surface of the wafer of the image sensor unit 30 is provided with a first electrode pad 35 for the electrical connection of the autofocusing unit 40 and the first electrode pad 35 is formed at a position corresponding to the formation position of the via 50, on the image sensor chip 32.

On the top surface of the image sensor chip 32, a cover glass 31 may be formed and one surface of the cover glass 31 is coated with IR to serve as the infrared interruption filter.

The infrared interruption filter removes an optical signal of an infrared area before the optical signal is inputted to the image sensor through the lens to receive only the optical signal of an visible ray area, thereby obtaining a color approaching an actual color.

The cover glass 31 protects the image formation area in which the light transmitting the lens unit 20 of the image sensor chip 32 is imaged. For example, it is possible to prevent foreign objects from being penetrated into the image formation area.

In the exemplary embodiment of the present invention, the edge portion of the cover glass 31 may be provided with a second through hole 34 communicating with the first though hole 24 formed in the lens unit 20. These first and second through holes 24 and 34 are filled with the conductive paste to form the via 50.

Referring to FIG. 4, the autofocusing unit 40 is disposed at the object side of the lens unit 20 and automatically control the focus of the lens unit 20. In the exemplary embodiment of the present invention, the autofocusing unit 40 uses an active lens that does not use a VCA or a piezoelectric actuator to control a focus according to an object distance.

The autofocusing unit 40 may use a liquid lens. The liquid lens is to perform the autofocusing according to the change in the object distance by changing a curvature due to strong attraction phenomenon of static electricity of polar fluid at a medium interface between the polar fluid and the non-polar fluid according to the voltage applied to the liquid lens and changing the refractive power of lens due to the change in curvature.

In addition, the autofocusing unit 40 may be configured to have a lens for changing the refractive power of lens for moving the focus of the lens according to the change in the object distance and an active lens for controlling a phase in order to prevent the abbreviation deterioration according to the change in the refractive power of lens.

The bottom surface of the autofocusing unit 40 is provided with a second electrode pad 45 to be electrically connected to the wafer of the image sensor unit 30. The second electrode pad 45 may be formed at the bottom edge portion of the autofocusing unit 40 and is formed at the position corresponding to the formation position of the via 50, on the autofocusing unit 40.

Therefore, the autofocusing unit 40 may be electrically connected to the image sensor unit 30 by electrically connecting the second electrode pad 45 with the first electrode pad 35 formed on the wafer of the image sensor unit 30 through the via 50. The wafer of the image sensor unit 30 is provided with a wiring pattern having various shapes.

The via 50 is formed by filling the first and second through holes 24 and 34 formed to penetrate through the lens unit 20 and the cover plate 31 with the conductive paste. The formation of the via 50 may depend on a screen printing method of forming a mask in the area other than the first and second through holes 24 and 34 and printing the conductive paste using the squeeze. The exemplary embodiment of the present invention is not limited thereto. Therefore, any method capable of sufficiently filling the conductive material in the first and second through holes 24 and 34 may be used without being specifically limited, and may use a method such as press printing, hand printing, vacuum suction, or the like.

As the conductive material of forming the via 50, Ag, Cu, Au, Ni, Pt, Pd, Ti, carbon nanotube, or the like, may be used.

The exemplary embodiment of the present invention describes that the via 50 is formed up to the cover glass, but is not limited thereto. When the cover glass 31 is not configured, the via 50 may be formed only in the lens unit 20.

In the exemplary embodiment of the present invention, in order to secure the positional precision of the via 50, the horizontal cross sectional areas of the lens unit 20, the image sensor unit 30, and the auto focusing unit 40 may be formed to be substantially the same.

The housing 10 has an inner space and has a structure in which the top and bottom portions thereof are opened. In detail, an accommodating part 12 accommodating the lens unit 20, the image sensor unit 30, and the autofocusing unit 40 and a capping part 11 formed to be bent in the accommodating part 12 to cover a portion of the autofocusing unit 40 may be provided.

As described above, according to the camera module according to the exemplary embodiment of the present invention, the component for the electrical connection of the autofocusing unit 40 is not provided at the outside of the camera module by using the separate member but provided in the lens unit or the lens unit and the cover glass not to cause the increase in the overall size of the camera module, thereby implementing the microminiaturization of the camera module.

Figure 5:
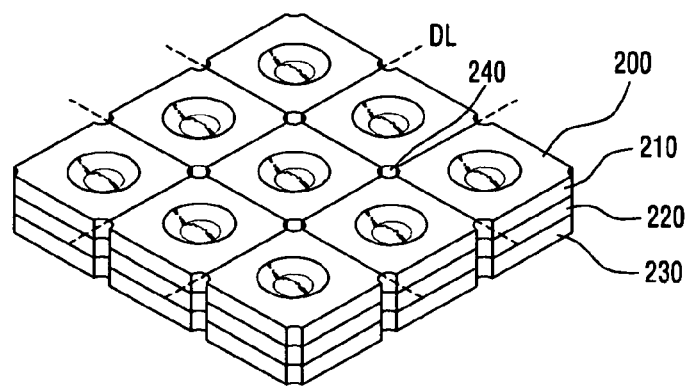
FIG. 5 is a diagram showing a lens wafer in a method for manufacturing a camera module according to an exemplary embodiment of the present invention.
Figure 6:
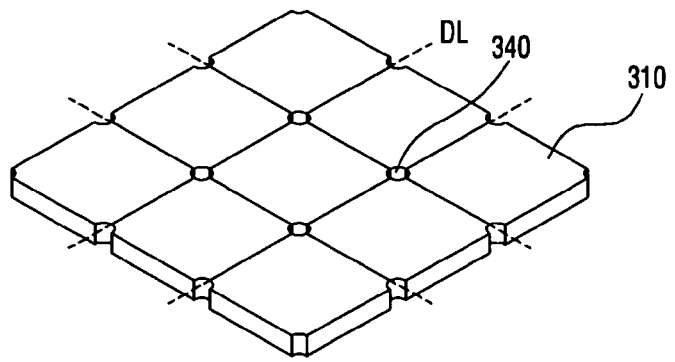
FIG. 6 is a diagram showing a cover glass wafer in a method for manufacturing a camera module according to an exemplary embodiment of the present invention.
Figure 7:
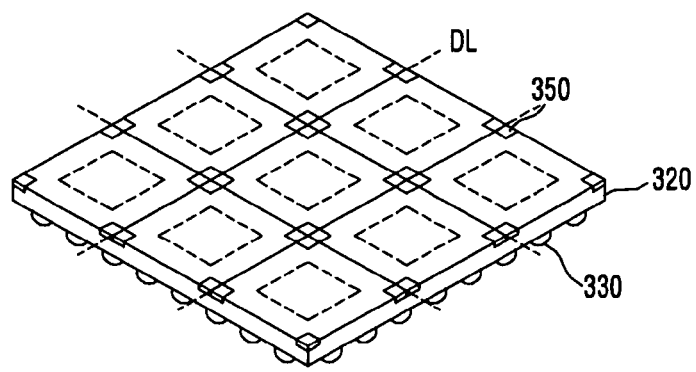
FIG. 7 is a diagram showing an image sensor wafer in the method for manufacturing a camera module according to an exemplary embodiment of the present invention.
Figure 8:
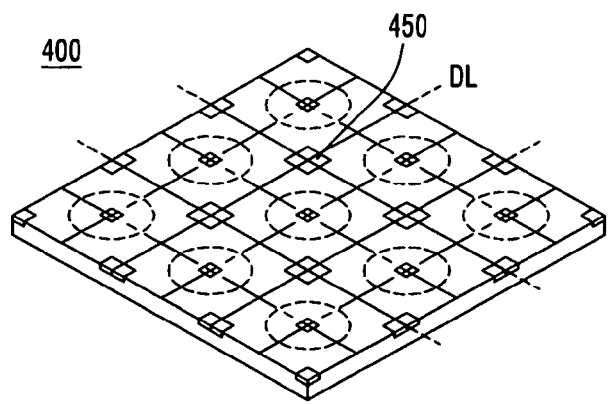
FIG. 8 is a diagram showing an autofocusing wafer in the method for manufacturing a camera module according to an exemplary embodiment of the present invention.

Hereinafter, the method for manufacturing the camera module according to the exemplary embodiment of the present invention will be described with reference to FIGS. 5 to 8, FIG. 5 is a diagram showing a lens wafer in a method for manufacturing a camera module according to an exemplary embodiment of the present invention; FIG. 6 is a diagram showing a cover glass wafer in a method for manufacturing a camera module according to an exemplary embodiment of the present invention; FIG. 7 is a diagram showing an image sensor wafer in the method for manufacturing a camera module according to an exemplary embodiment of the present invention; and FIG. 8 is a diagram showing an autofocusing wafer in the method for manufacturing a camera module according to an exemplary embodiment of the present invention.

As shown in FIGS. 5 to 8, the camera module according to the exemplary embodiment of the present invention is formed by manufacturing the lens unit, the image sensor unit, and the autofocusing unit, which are components, on a wafer scale, cutting the wafer into individual units, and stacking individual units.

In this case, the via for electrically connecting the autofocusing unit may be also manufactured on the wafer scale, thereby improving the productivity.

First, referring to FIG. 5, first to third lens wafers 210 to 230 in which each of the plurality of lenses are arranged are stacked along the optical axis. The exemplary embodiment of the present invention may be formed by stacking three sheets of lens wafers, but is not limited thereto. Therefore, three sheets or more or three sheets or less lens wafers may be stacked.

The stacked lens wafer 200 is provided with the first through hole 240 penetrating through the lens wafer 200 in a thickness direction. The through hole may be formed by a method of using a micro drill, a method of using a punch, a method of laser ablation, or the like.

In the exemplary embodiment of the present invention, the method of forming a through hole is not limited thereto. The through hole may be formed simultaneously with the formation of the lens wafer using the plastic resin by forming the protrusion corresponding to the shape of the through hole in the mold for forming each lens wafer.

The first through hole 240 may be formed at a boundary part partitioning each lens unit. That is, the first through hole is formed at the edge portions of the unit lens of the lens wafer. By this configuration, the through hole may be formed in four lens units at a time, thereby improving the productivity.

The via is formed by filling the first through hole 240 with the conductive material. As the conductive material, Ag, Cu, Au, Ni, Pt, Pd, Ti, carbon nanotube, or the like, may be used and the via may be formed by using the screen printing method. The present invention is not limited thereto and the known methods for forming the via may be used.

Referring to FIG. 6, a second through hole 340 is formed on the cover glass wafer 310. The cover glass wafer 310 is stacked on the top portion of the image sensor wafer 320 to protect the image formation area of the image sensor.

The exemplary embodiment of the present invention is not necessarily require the glass wafer 310 and when the cover glass wafer 310 is not configured, the via may be formed by filling the first through hole 240 with the conductive material.

The second through hole 340 is formed at the boundary part partitioning the cover glass for the unit module, such that the through holes may be formed in four cover glasses at a time.

The via is formed by filling the second through hole 340 with the conductive material. The via may be formed in the first through hole 240 formed on the lens wafer 200 and formed in the second through hole 340 formed on the cover glass wafer 310. These wafers are stacked, such that the portions in which the via is formed are connected. Alternatively, after stacking the lens wafer 200 on which the first through hole 240 is formed and the cover glass wafer 310 on which the second through hole 340 is formed, the via may be formed at a time by filling the through holes 240 and 340 with the conductive material.

The first and second through holes 240 and 340 are each formed and may communicate with each other by the stacking, but the exemplary embodiment of the present invention is not limited thereto. After the lens wafer 200 and the cover glass 310 are stacked, the first and second through holes 240 and 340 may be simultaneously formed by one-time perforation. In this case, the via may simultaneously be formed in the first and second through holes 240 and 340.

Referring to FIG. 7, the bottom surface of the image sensor wafer 320 is provided with a connection member 330 to be connected with the terminal of the main substrate (not shown) on which the camera module is mounted and the top surface thereof is provided with a first electrode pad 350 for electrically connect the autofocusing unit to the circuit substrate of the image sensor.

The connection member 330 may be made of a conductive paste, in detail, a solder paste or an Ag-epoxy resin. In addition, the connection member 330 may be a solder ball shape.

The first electrode pad 350 may be formed at a position corresponding to the first and second through holes 240 and 340. That is, the first electrode pad 350 may be formed at a boundary part partitioning each image sensor unit, for example, at the edge portions of each image sensor unit as a single electrode pad and may then be separated by the cutting through a dicing line DL.

Referring to FIG. 8, a second electrode pad 450 is formed on the autofocusing wafer 400. The second electrode pad 450 may be formed at a position corresponding to the first and second through holes 240 and 340. That is, the second electrode pad 450 may be formed at a boundary part partitioning each autofocusing unit of the autofocusing wafer 400, for example, at the edge portions of each autofocusing unit as a single electrode pad and may then be separated by the cutting through a dicing line DL.

After each wafer manufactured as described above is stacked, the camera module is completed by cutting the wafer along the dicing line DL for each module and inserting the cut wafer into the housing.

As described above, according to the method for manufacturing a camera module according to the exemplary embodiment of the present invention, each unit configuring the camera module as well as the components for electrically connecting the autofocusing units may be manufactured into the wafer scale, thereby improving the productivity.

As set forth above, the camera module and the method for manufacturing the same according to the exemplary embodiment of the present invention can implement the autofocusing function while minimizing the increase in the overall size.

For example, the order of the method for forming a via and the method for manufacturing a camera module according to the present invention is only an example and therefore, the via may be formed in various manners and each step of the method for manufacturing a camera module may be made in various orders according to the required situations.

While the present invention has been shown and described in connection with the exemplary embodiments, it will be apparent to those skilled in the art that modification and variation can be made with out departing from the spirit and scope of the invention as defined by the appended claims.

What is claimed is:

1. A camera module, comprising:
  a lens unit including at least one lens stacked along an optical axis;
  an autofocusing unit disposed on an object side of the lens unit and automatically controlling a focus of the lens unit;
  an image sensor unit receiving light incident through the lens unit; and
  at least one via formed in the lens unit to be penetrated in a thickness direction thereof for an electrical connection of the autofocusing unit,
  wherein the image sensor unit includes a cover glass covering an image formation area in which light transmitting the lens unit is imaged the at least one via is formed by penetrating through the cover glass in a thickness direction thereof.

2. The camera module of claim 1, wherein the at least one via is formed by filling at least one through hole penetrating through the lens unit in the thickness direction thereof with a conductive material.

3. The camera module of claim 1, wherein the at least one via connects a first electrode pad formed on a wafer of the image sensor unit with a second electrode pad formed on the autofocusing unit.

4. The camera module of claim 1, wherein the at least one via is formed at an edge of the lens unit.

5. The camera module of claim 1, wherein each of the at least one lens includes a lens function part and a flange part forming an outside of the lens function part.

6. The camera module of claim 5, wherein the at least one via is formed in the flange part.

7. The camera module of claim 1, wherein the autofocusing unit is a liquid lens.

8. A method for manufacturing a camera module, comprising:
   stacking at least one lens wafer on which a plurality of lenses are arranged along an optical axis;
   stacking an autofocusing wafer automatically controlling a focus of the lens on an object side of the stacked lens wafer;
   forming at least one via penetrating through the stacked lens wafer in a thickness direction thereof for electrically connecting the autofocusing wafer;
   stacking an image sensor wafer receiving light incident from the lens on an image side of the stacked lens wafer; and
   cutting the stacked lens wafer, the autofocusing wafer, and the image sensor wafer for each module,
   wherein the forming of the via is formed to penetrate through a cover glass wafer covering an image formation area of the image sensor wafer in a thickness direction thereof.

9. The method of claim 8, wherein the forming of the via includes forming at least one through hole penetrating through the stacked lens wafer in the thickness direction thereof and filling the through hole with a conductive material.

10. The method of claim 8, wherein the forming of the via electrically connects a first electrode pad formed on the image sensor wafer to a second electrode pad formed on the autofocusing wafer.

11. The method of claim 8, wherein the forming of the via includes forming the via at an edge portion of the unit lens of the lens wafer.

* * * * *